United States Patent
Bae et al.

(10) Patent No.: US 12,523,700 B2
(45) Date of Patent: Jan. 13, 2026

(54) BATTERY DIAGNOSING APPARATUS AND METHOD

(71) Applicant: LG Energy Solution, Ltd., Seoul (KR)

(72) Inventors: Yoon-Jung Bae, Daejeon (KR); A-Ming Cha, Daejeon (KR); Kyung-Hwa Woo, Daejeon (KR); Hee-Seok Jeong, Daejeon (KR)

(73) Assignee: LG ENERGY SOLUTION, LTD. (KR)

( * ) Notice: Subject to any disclaimer, the term of this patent is extended or adjusted under 35 U.S.C. 154(b) by 415 days.

(21) Appl. No.: 18/022,600

(22) PCT Filed: Dec. 7, 2021

(86) PCT No.: PCT/KR2021/018488
§ 371 (c)(1),
(2) Date: Feb. 22, 2023

(87) PCT Pub. No.: WO2022/124773
PCT Pub. Date: Jun. 16, 2022

(65) Prior Publication Data
US 2023/0314515 A1    Oct. 5, 2023

(30) Foreign Application Priority Data
Dec. 7, 2020    (KR) .................. 10-2020-0169917

(51) Int. Cl.
G01R 31/367    (2019.01)
G01R 31/3835    (2019.01)
(Continued)

(52) U.S. Cl.
CPC ....... G01R 31/367 (2019.01); G01R 31/3835 (2019.01); G01R 31/392 (2019.01); H01M 10/4285 (2013.01)

(58) Field of Classification Search
CPC  G01R 31/367; G01R 31/3835; G01R 31/392; G01R 19/16542; G01R 19/16566;
(Continued)

(56) References Cited

U.S. PATENT DOCUMENTS

2012/0105069 A1*    5/2012    Wang ................... G01R 31/392
324/427
2012/0169288 A1    7/2012    Ueki et al.
(Continued)

FOREIGN PATENT DOCUMENTS

CN    102768343 A    11/2012
JP    2010-230469 A    10/2010
(Continued)

OTHER PUBLICATIONS

International Search Report for Application No. PCT/KR2021/018488 mailed Mar. 21, 2022, pp. 1-3.

*Primary Examiner* — Catherine T. Rastovski
*Assistant Examiner* — Yossef Korang-Beheshti
(74) *Attorney, Agent, or Firm* — BRYAN CAVE LEIGHTON PAISNER LLP

(57) ABSTRACT

A battery diagnosing apparatus includes a profile generating unit configured to generate a differential profile representing a corresponding relationship between a voltage of a battery and a differential capacity for the voltage of the battery and a control unit configured to receive the differential profile from the profile generating unit, determine a target peak in the differential profile, determine a behavior pattern of the target peak based on a reference peak included in a preset reference profile, and diagnose a state of a negative electrode of the battery by comparing the behavior pattern determined for the target peak with a plurality of preset behavior types.

20 Claims, 6 Drawing Sheets

(51) Int. Cl.
*G01R 31/392* (2019.01)
*H01M 10/42* (2006.01)

(58) Field of Classification Search
CPC ............ G01R 31/3648; G01R 31/382; H01M 10/4285; Y02E 60/10
See application file for complete search history.

(56) References Cited

U.S. PATENT DOCUMENTS

| | | |
|---|---|---|
| 2012/0226455 A1 | 9/2012 | Kumashiro et al. |
| 2013/0335009 A1 | 12/2013 | Katsumata et al. |
| 2016/0061908 A1 | 3/2016 | Torai et al. |
| 2016/0233691 A1* | 8/2016 | Sumi ..................... H01M 4/587 |
| 2020/0366115 A1 | 11/2020 | Kim et al. |
| 2021/0021000 A1 | 1/2021 | Sada et al. |
| 2024/0055592 A1* | 2/2024 | Kim ..................... H01M 4/525 |

FOREIGN PATENT DOCUMENTS

| | | |
|---|---|---|
| JP | 2012-150924 A | 8/2012 |
| JP | 5287872 B2 | 9/2013 |
| JP | 2014-002055 A | 1/2014 |
| JP | 2017129409 A | 7/2017 |
| JP | 2017168361 A | 9/2017 |
| JP | 2018-147748 A | 9/2018 |
| JP | 6500789 B2 | 4/2019 |
| JP | 201996552 A | 6/2019 |
| JP | 2019158597 A | 9/2019 |
| JP | 6607167 B2 | 11/2019 |
| JP | 6981208 B2 * | 12/2021 |
| KR | 101337153 B1 | 12/2013 |
| KR | 20130142884 A | 12/2013 |
| KR | 20150099972 A | 9/2015 |
| KR | 101878538 B1 | 7/2018 |
| KR | 20200026128 A | 3/2020 |
| WO | 2019/171688 A1 | 9/2019 |

* cited by examiner

BATTERY DIAGNOSING APPARATUS AND METHOD

CROSS-REFERENCE TO RELATED APPLICATIONS

The present application is a national phase entry under 35 U.S.C. § 371 of International Application No. PCT/KR2021/018488 filed Dec. 7, 2021, which claims priority to Korean Patent Application No. 10-2020-0169917 filed on Dec. 7, 2020, all of which are incorporated herein by reference.

TECHNICAL FIELD

The present disclosure relates to a battery diagnosing apparatus and method, and more particularly, to a battery diagnosing apparatus and method capable of diagnosing a state of a negative electrode of a battery.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance batteries allowing repeated charging and discharging are being actively studied.

Batteries commercially available at present include nickel-cadmium batteries, nickel hydrogen batteries, nickel-zinc batteries, lithium batteries and the like. Among them, the lithium batteries are in the limelight since they have almost no memory effect compared to nickel-based batteries and also have very low self-charging rate and high energy density.

While a battery is being charged, a polarization phenomenon occurs internally in the battery. The polarization phenomenon depends on various resistance components of the battery (e.g., ohmic resistance, charge transfer resistance, diffusion resistance). The reason that the battery voltage during charging is higher than the open circuit voltage (OCV) is that overvoltage (over-potential) is formed by the polarization phenomenon.

As the battery is degraded, the polarization phenomenon tends to intensify. Therefore, even if the charging conditions (e.g., charging current, temperature) are the same, the magnitude of the overvoltage may increase as the degree of degradation of the battery increases. If the overvoltage is increased excessively, there is a problem that the degradation of the battery is accelerated. For example, during charging, the voltage of the negative electrode of the battery gradually drops. Here, if the voltage of the negative electrode of the battery drops below 0 V due to overvoltage, lithium metal is rapidly precipitated on the negative electrode, and as a result, the amount of loss of lithium ions that may participate in a charging and discharging reaction may increase.

In addition, the negative electrode (e.g., graphite) of the battery may undergo a stabilizing process in which the reaction area is increased through contraction and expansion during the initial charging/discharging process. During the stabilizing process, the overvoltage of the negative electrode may be reduced compared to the initial stage due to the increase of the reaction area of the negative electrode. That is, the increase in the reaction area of the negative electrode in the initial charging/discharging process is due to the contraction and expansion of the negative electrode, which causes a decrease in overvoltage.

Conversely, the overvoltage of the negative electrode may gradually increase as the battery is degraded. For example, the overvoltage of the negative electrode may gradually increase due to the influence of the reduction decomposition of the electrolyte and the generation of solid electrolyte interphase (SEI) according to the degradation of the battery.

Therefore, in order to prevent the battery from being rapidly degraded and to increase the lifespan of the battery, it is necessary to develop a technology that may diagnose the negative electrode state of the battery more specifically based on the difference caused by the stabilizing process and the degradation of the battery.

SUMMARY

Technical Problem

The present disclosure is designed to solve the problems of the related art, and therefore the present disclosure is directed to providing a battery diagnosing apparatus and method capable of diagnosing a negative electrode state of a battery more specifically based on the voltage and capacity of the battery.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

A battery diagnosing apparatus according to one aspect of the present disclosure may comprise a controller; and memory having programmed thereon instructions that, when executed, are configured to cause the processor to: receive a differential profile representing a relationship between a voltage of a battery and a differential capacity of the battery, determine a first target peak in the differential profile, determine a behavior pattern of the first target peak based on a first reference peak included in a preset reference profile, compare the determined behavior pattern with a plurality of preset behavior types, and diagnose a state of a negative electrode of the battery based on the comparison.

The instructions may be configured to cause the controller to diagnose the state of the negative electrode of the battery as either an overvoltage state or a stabilized state based on the determined behavior pattern corresponding to a first behavior type or a second behavior type of the plurality of behavior types.

In the first behavior type, a voltage of the first target peak may exceed a voltage of the first reference peak and a differential capacity of the first target peak may be less than a differential capacity of the first reference peak; and in the second behavior type, the voltage of the first target peak may be less than the voltage of the first reference peak and the differential capacity of the first target peak may be equal to or greater than the differential capacity of the first reference peak.

The instructions may be configured to cause the controller to diagnose the state of the negative electrode of the battery as the overvoltage state in response to the behavior pattern corresponding to the first behavior type.

The instructions may be configured to cause the controller to diagnose the state of the negative electrode of the battery as the stabilized state in response to the behavior pattern corresponding to the second behavior type.

The instructions may be configured to cause the controller to in response to the differential profile including a plurality of peaks within a predetermined voltage region, select the plurality of peaks, and in response to a differential capacity of each of the plurality of selected peaks being less than the differential capacity of the first reference peak and a voltage of each of the plurality of peaks exceeding the voltage of the first reference peak, diagnose the state of the negative electrode of the battery as the overvoltage state.

Selection of the plurality of peaks within the predetermined voltage region may be in response to the behavior pattern corresponding to the first behavior type.

The instructions may be configured to cause the controller to determine a second target peak in the differential profile, the second target peak having a different voltage from the first target peak, determine a second behavior pattern of the second target peak for a second reference peak included in the reference profile, and diagnose the state of the negative electrode of the battery as the stabilized state in response to both the first behavior pattern and the second behavior pattern corresponding to the second behavior type.

Determination of the second target peak may be in response to the behavior pattern of the first target peak corresponding to the second behavior type.

The instructions may be configured to cause the controller to decrease at least one of an available state of charge (SOC) region and a maximum allowable temperature of the battery in response to the state of the negative electrode of the battery being diagnosed as the stabilized state.

The first target peak may have a maximum differential capacity in the differential profile.

A battery pack according to another aspect of the present disclosure may comprise the battery diagnosing apparatus according to any embodiment of the present disclosure.

A battery diagnosing method according to still another aspect of the present disclosure may comprise: receiving, by a controller, a differential profile representing a relationship between a voltage of a battery and a differential capacity of the battery; determining, by the controller, a target peak in the differential profile; determining, by the controller, a behavior pattern of the target peak based on a reference peak included in a preset reference profile; comparing, by the controller, the determined behavior pattern with a plurality of preset behavior types; and diagnosing, by the controller, a state of a negative electrode of the battery based on the comparison.

Advantageous Effects

According to one aspect of the present disclosure, there is an advantage of diagnosing a state of a negative electrode of a battery as an overvoltage state or a stabilized state based on the voltage and capacity of the battery.

In addition, according to one aspect of the present disclosure, since the usage condition corresponding to the battery may be set according to the diagnosed the state of the negative electrode of the battery, there is an advantage that the degradation of the battery may be prevented and the lifespan may be increased.

The effects of the present disclosure are not limited to the effects mentioned above, and other effects not mentioned will be clearly understood by those skilled in the art from the description of the claims.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Throughout the specification, when a portion is referred to as "comprising" or "including" any element, it means that the portion may include other elements further, without excluding other elements, unless specifically stated otherwise.

In addition, terms such as a control unit described in the specification mean a unit that processes at least one function or operation, which may be implemented as hardware or software, or a combination of hardware and software.

In addition, throughout the specification, when a portion is referred to as being "connected" to another portion, it is not limited to the case that they are "directly connected", but it also includes the case where they are "indirectly connected" with another element being interposed between them.

Hereinafter, preferred embodiments of the present disclosure will be described in detail with reference to the accompanying drawings.

Figure 1:
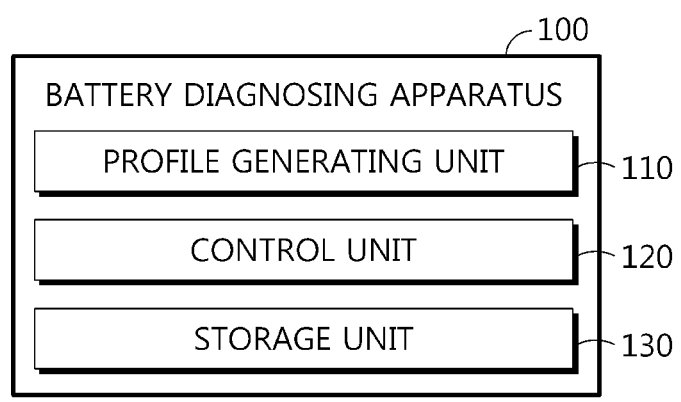
FIG. 1 is a diagram schematically showing a battery diagnosing apparatus according to an embodiment of the present disclosure.

FIG. 1 is a diagram schematically showing a battery diagnosing apparatus 100 according to an embodiment of the present disclosure.

Referring to FIG. 1, the battery diagnosing apparatus 100 may include a profile generating unit 110 and a control unit 120.

The profile generating unit 110 may be configured to generate a differential profile representing a corresponding relationship between a voltage of a battery and a differential capacity for the voltage of the battery.

Here, the battery means a physically separable one independent cell having a negative electrode terminal and a positive electrode terminal. For example, one pouch-type lithium polymer cell may be regarded as a battery.

Specifically, the profile generating unit 110 may obtain a voltage profile representing a corresponding relationship between voltage and capacity of a battery. In addition, the profile generating unit 110 may calculate a differential capacity (dQ/dV) by differentiating the capacity with respect to the voltage of the battery. The profile generating unit 110 may generate a differential profile representing a corresponding relationship between the voltage of the battery and the calculated differential capacity.

Figure 2:
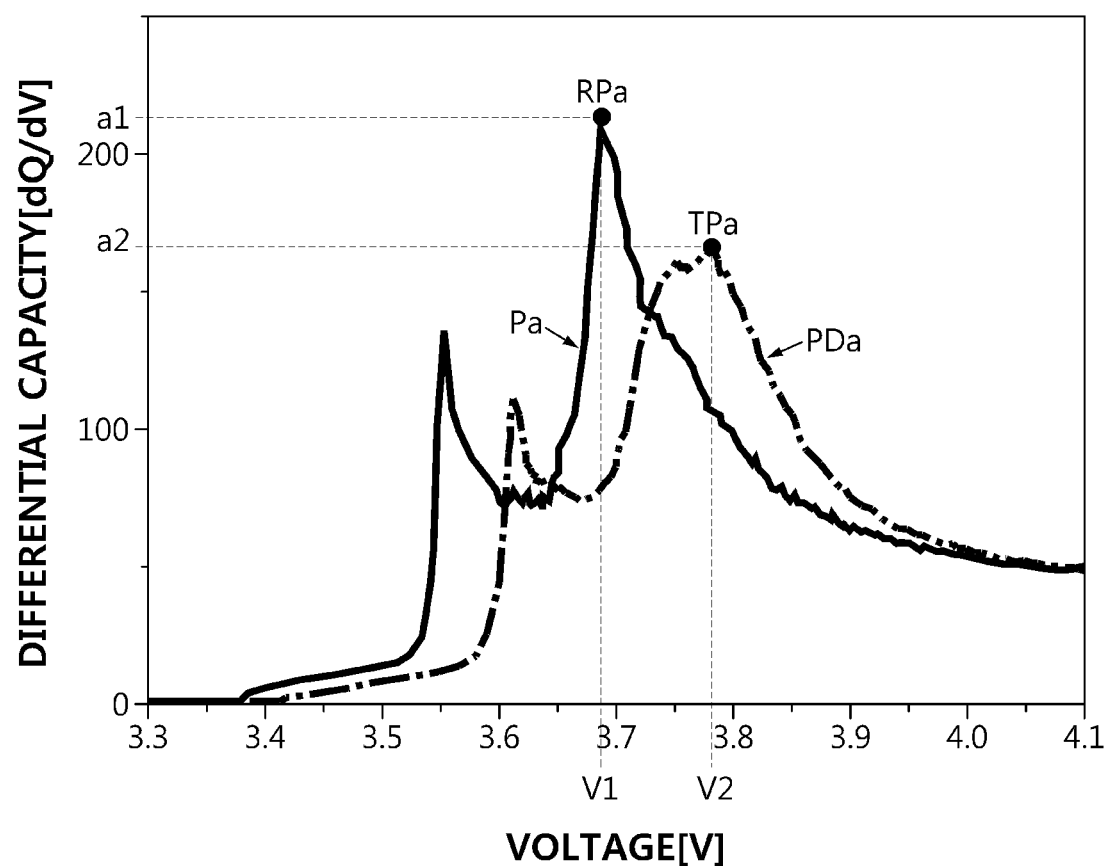
FIG. 2 is a diagram schematically showing an embodiment for diagnosing a state of a negative electrode of a battery based on a reference profile and a differential profile by the battery diagnosing apparatus according to an embodiment of the present disclosure.

FIG. 2 is a diagram schematically showing an embodiment for diagnosing a state of a negative electrode of a battery based on a reference profile Pa and a differential profile PDa by the battery diagnosing apparatus 100 according to an embodiment of the present disclosure.

Referring to FIG. 2, the differential profile PDa generated by the profile generating unit 110 may be expressed as an X-Y graph when the voltage of the battery is set to X and the differential capacity to the voltage of the battery is set to Y. Here, the differential capacity is a value obtained by differentiating the capacity of the battery with a voltage, and may be expressed as [dQ/dV].

The control unit 120 may be configured to receive the differential profile PDa from the profile generating unit 110.

Specifically, the control unit 120 and the profile generating unit 110 may be connected to communicate with each other. The profile generating unit 110 may transmit the generated differential profile PDa to the control unit 120, and the control unit 120 may receive the differential profile PDa.

The control unit 120 may be configured to determine a target peak TPa in the differential profile PDa.

Here, the peak may be a point having an upwardly convex form in the differential profile PDa. Specifically, the peak may be a point at which the instantaneous change rate of the differential capacity with respect to voltage is 0 in the differential profile PDa, where the instantaneous change rate of a low voltage side based on the peak may be positive and the instantaneous change rate of a high voltage side may be negative.

For example, in the embodiment of FIG. 2, a plurality of peaks may be included in the differential profile PDa. The control unit 120 may determine any one of the plurality of peaks included in the differential profile PDa as a target peak TPa. Preferably, the control unit 120 may be configured to determine a peak having a maximum differential capacity in the differential profile PDa as the target peak TPa.

In the embodiment of FIG. 2, the target peak TPa having a maximum differential capacity in the differential profile PDa may have a voltage of V2, and the differential capacity may be a2.

In addition, the control unit 120 may be configured to determine a behavior pattern of the target peak TPa based on a reference peak RPa included in a preset reference profile Pa.

Specifically, the control unit 120 may determine the behavior pattern of the target peak TPa by comparing the voltages of the reference peak RPa and the target peak TPa and comparing the differential capacities thereof.

For example, the control unit 120 may determine whether the voltage of the target peak TPa is less than or greater than the voltage of the reference peak RPa. In addition, the control unit 120 may determine whether the differential capacity of the target peak TPa is less than or greater than the differential capacity of the reference peak RPa.

In the embodiment of FIG. 2, the voltage of the reference peak RPa may be V1, and the differential capacity may be a1. In addition, the voltage of the target peak TPa may be V2, and the differential capacity may be a2. The control unit 120 may determine that the voltage of the target peak TPa exceeds the voltage of the reference peak RPa, and that the differential capacity of the target peak TPa is less than the differential capacity of the reference peak RPa.

The control unit 120 may be configured to diagnose the state of the negative electrode of the battery by comparing the behavior pattern determined for the target peak with a plurality of predetermined behavior types.

Specifically, the control unit 120 may be configured to diagnose the state of the negative electrode of the battery as an overvoltage state or a stabilized state according to a behavior type corresponding to the behavior pattern among the plurality of behavior types.

For example, the plurality of behavior types may include a first behavior type corresponding to the overvoltage state and a second behavior type corresponding to the stabilized state.

Here, the overvoltage state may be a state in which the battery is degraded so that overvoltage is generated at the negative electrode of the battery compared to the negative electrode of the battery in a BOL (Beginning of Life) state. The stabilized state may be a state in which the negative electrode of the battery contracts and expands during the initial charging/discharging process.

The control unit 120 may determine the behavior pattern of the target peak TPa for the reference peak RPa, and specifically diagnose whether the state of the negative electrode of the battery is an overvoltage state or a stabilized state based on the determined behavior pattern.

Therefore, the battery diagnosing apparatus 100 according to an embodiment of the present disclosure has an advantage of specifically classifying and diagnosing the state of the negative electrode of the battery based on the differential profile for the battery.

Meanwhile, the control unit 120 provided to the battery diagnosing apparatus 100 may optionally include a processor, an application-specific integrated circuit (ASIC), another chipset, a logic circuit, a register, a communication modem, and a data processing device, and the like, known in the art to execute various control logics performed in the present disclosure. In addition, when the control logic is implemented in software, the control unit 120 may be implemented as a set of program modules. At this time, the program module may be stored in a memory and executed by the control unit 120. The memory may be provided in or out of the control unit 120, and may be connected to the control unit 120 by various well-known means.

In addition, the battery diagnosing apparatus 100 may further include a storage unit 130. The storage unit 130 may store data or programs necessary for operation and function of each component of the battery diagnosing apparatus 100, data generated in the process of performing the operation or function, or the like. The storage unit 130 is not particularly limited in its kind as long as it is a known information storage means that can record, erase, update and read data. As an example, the information storage means may include random access memory (RAM), flash memory, read-only memory (ROM), electrically erasable programmable read-only memory (EEPROM), registers, and the like. In addition, the storage unit 130 may store program codes in which processes executable by the control unit 120 are defined.

For example, the storage unit 130 may store the reference profile and the voltage profile for the battery. The profile generating unit 110 may access the storage unit 130 to obtain a voltage profile and then generate a differential profile based on the obtained voltage profile. As another example, the profile generating unit 110 may directly receive a voltage profile from the outside.

In addition, the storage unit 130 may store the differential profile generated by the profile generating unit 110. In addition, the control unit 120 may directly receive the differential profile from the profile generating unit 110, or may access the storage unit 130 to obtain the differential profile stored in the storage unit 130. In addition, the control unit 120 may access the storage unit 130 to obtain the reference profile for the battery.

Hereinafter, a plurality of behavior types and a process of diagnosing the state of the negative electrode of the battery according to the behavior types will be described in detail.

The plurality of behavior types may include a first behavior type in which a voltage of the target peak exceeds a voltage of the reference peak and a differential capacity of the target peak is less than a differential capacity of the reference peak.

The control unit 120 may be configured to diagnose the state of the negative electrode of the battery as the overvoltage state, when the behavior pattern determined for the target peak corresponds to the first behavior type.

For example, in the embodiment of FIG. 2, the voltage of the target peak TPa may be V2, and the voltage of the reference peak RPa may be V1. In addition, the differential capacity of the target peak TPa may be a2, and the differential capacity of the reference peak RPa may be a1. Since the voltage of the target peak TPa exceeds the voltage of the reference peak RPa and the differential capacity of the target peak TPa is less than the differential capacity of the reference peak RPa, the control unit 120 may judge that the behavior pattern of the target peak TPa corresponds to the first behavior type. Accordingly, the control unit 120 may diagnose the state of the negative electrode of the battery of FIG. 2 as the overvoltage state.

Also, the plurality of behavior types may include a second behavior type in which a voltage of the target peak TPb is less than a voltage of the reference peak RPb and a differential capacity of the target peak TPb is equal to or greater than a differential capacity of the reference peak RPb.

The control unit 120 may be configured to diagnose the state of the negative electrode of the battery as the stabilized state, when the behavior pattern determined for the target peak corresponds to the second behavior type.

Figure 3:
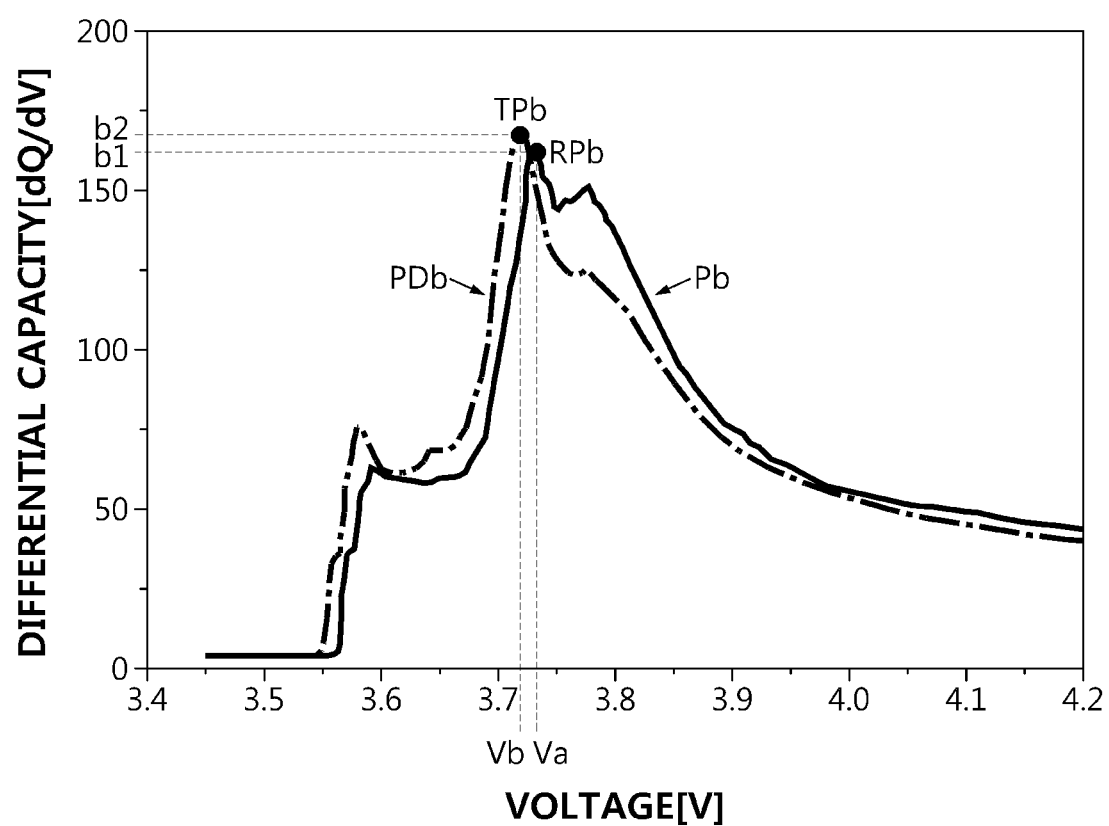
FIG. 3 is a diagram schematically showing another embodiment for diagnosing a state of the negative electrode of the battery based on the reference profile and the differential profile by the battery diagnosing apparatus according to an embodiment of the present disclosure.

FIG. 3 is a diagram schematically showing another embodiment for diagnosing a state of the negative electrode of the battery based on the reference profile Pb and the differential profile PDb by the battery diagnosing apparatus 100 according to an embodiment of the present disclosure.

The reference profile Pb and the differential profile PDb of FIG. 3 may be different from the reference profile Pa and the differential profile PDa of FIG. 2. For example, the target batteries of FIGS. 2 and 3 may be different batteries.

The reference profile may be set for each battery, and preferably may be preset by reflecting the BOL state of the battery. That is, the reference profile is not uniformly set for the same type of batteries, but may be individually set for each battery by reflecting the BOL state of the battery. Accordingly, the state of the negative electrode of the battery diagnosed by the control unit 120 may be determined in consideration of the BOL state of the battery that is a target for diagnosing the state of the negative electrode.

In the embodiment of FIG. 3, the voltage of the target peak TPb may be Vb, and the voltage of the reference peak RPb may be Va. In addition, the differential capacity of the target peak TPb may be b2, and the differential capacity of the reference peak RPb may be b1. Since the voltage of the target peak TPb is less than the voltage of the reference peak RPb and the differential capacity of the target peak TPb is equal to or greater than the differential capacity of the reference peak RPb, the control unit 120 may judge that the behavior pattern of the target peak TPb corresponds to the second behavior type. Accordingly, the control unit 120 may judge the state of the negative electrode of the battery of FIG. 3 as the stabilized state.

When a plurality of peaks are present within a predetermined voltage region based on the voltage of the target peak, the control unit 120 may be configured to select the plurality of peaks.

Figure 4:
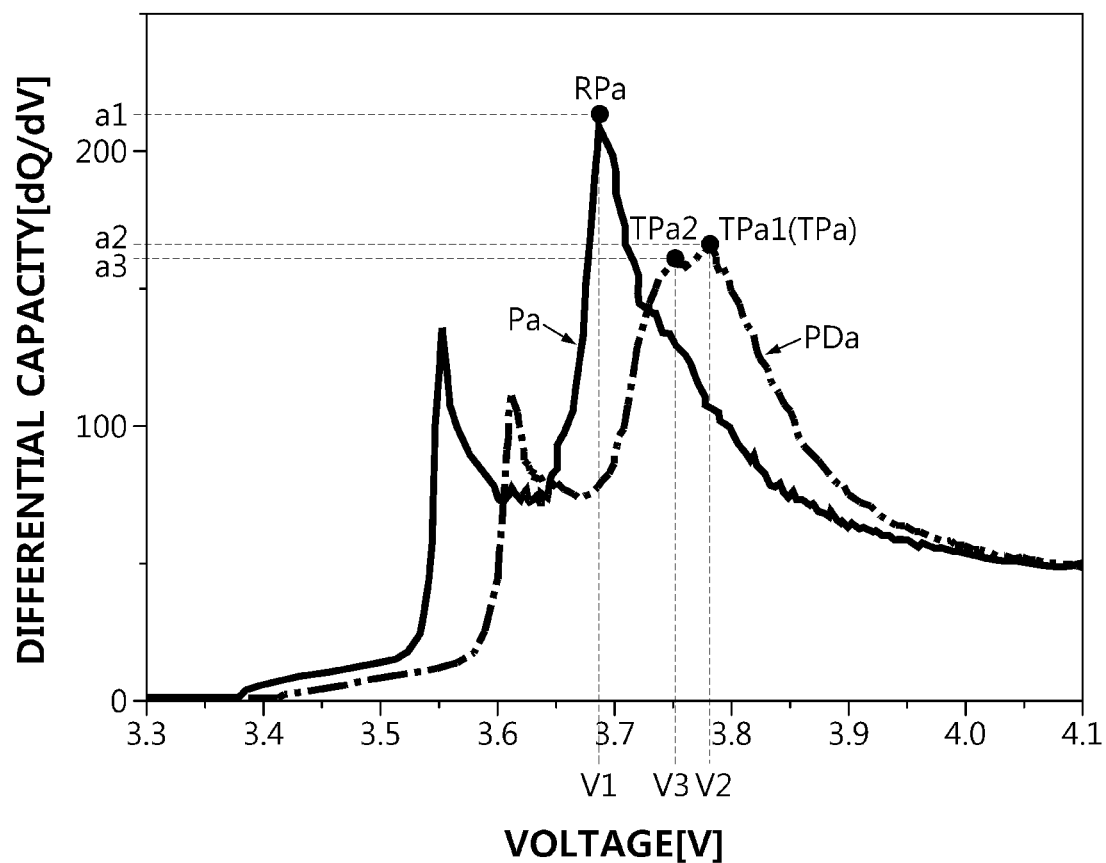
FIG. 4 is a diagram schematically showing still another embodiment for diagnosing a state of the negative electrode of the battery based on the reference profile and the differential profile by the battery diagnosing apparatus according to an embodiment of the present disclosure.

FIG. 4 is a diagram schematically showing still another embodiment for diagnosing a state of the negative electrode of the battery based on the reference profile and the differential profile by the battery diagnosing apparatus 100 according to an embodiment of the present disclosure. Hereinafter, it is assumed that the reference profile and the differential profile of FIGS. 2 and 4 are the same.

In the embodiment of FIG. 4, a first peak TPa1 and a second peak TPa2 may be included in the predetermined voltage region of the differential profile PDa based on the voltage of the target peak TPa. Here, the first peak TPa1 may be the target peak TPa.

For example, the predetermined voltage region may be a 0.2V region based on the voltage of the target peak TPa. The control unit 120 may select the first peak TPa1 and the second peak TPa2 within the voltage region of 0.2V based on V2, which is the voltage of the target peak TPa. Preferably, the control unit 120 may select a peak having a differential capacity closest to the first peak TPa1 within the predetermined voltage region as the second peak TPa2.

When the differential capacity of each of the plurality of selected peaks is less than the differential capacity of the reference peak RPa and the voltage of each of the plurality of peaks exceeds the voltage of the reference peak RPa, the control unit 120 may be configured to diagnose the state of the negative electrode of the battery as the overvoltage state.

For example, in the embodiment of FIG. 4, the voltage of the first peak TPa1 may be V2, the voltage of the second peak TPa2 may be V3, and the voltage of the reference peak RPa may be V1. In addition, the differential capacity of the first peak TPa1 may be a2, the differential capacity of the second peak TPa2 may be a3, and the differential capacity of the reference peak RPa may be a1. Since the voltages of the first peak TPa1 and the second peak TPa2 exceed the voltage of the reference peak RPa and the differential capacities of the first peak TPa1 and the second peak TPa2 are less than the differential capacity of the reference peak RPa, the control unit 120 may be configured to diagnose the state of the negative electrode of the battery of FIG. 4 as the overvoltage state.

Meanwhile, the control unit 120 may be configured to determine a plurality of peaks within the predetermined voltage region, when the behavior pattern determined for the target peak TPa corresponds to the first behavior type.

For example, referring to FIGS. 2 and 4, the voltage of the target peak TPa may exceed the voltage of the reference peak RPa, and the differential capacity of the target peak TPa may be less than the differential capacity of the reference peak RPa. Accordingly, the control unit 120 may determine the behavior pattern of the target peak TPa first, and then determine the first peak TPa1 and the second peak TPa2 when the behavior pattern determined for the target peak TPa corresponds to the first behavior type.

That is, when the behavior pattern of the target peak TPa is the first behavior type, the control unit 120 may additionally compare the behavior patterns of the first peak TPa1 and the second peak TPa2 with the plurality of behavior types in order to more accurately diagnose the state of the negative electrode of the battery.

Accordingly, the control unit 120 may more specifically and accurately diagnose the state of the negative electrode of the battery by further considering the behavior pattern of the second peak TPa2 as well as the behavior pattern of the first peak TPa1.

The control unit 120 may be configured to determine a first target peak and a second target peak having different voltages in the differential profile.

Specifically, the voltage bands in which the first target peak and the second target peak appear may be different from each other. For example, the first target peak may appear near about 3.7V, and the second target peak may appear near about 3.6V. Here, the first target peak may be the target peak.

Figure 5:
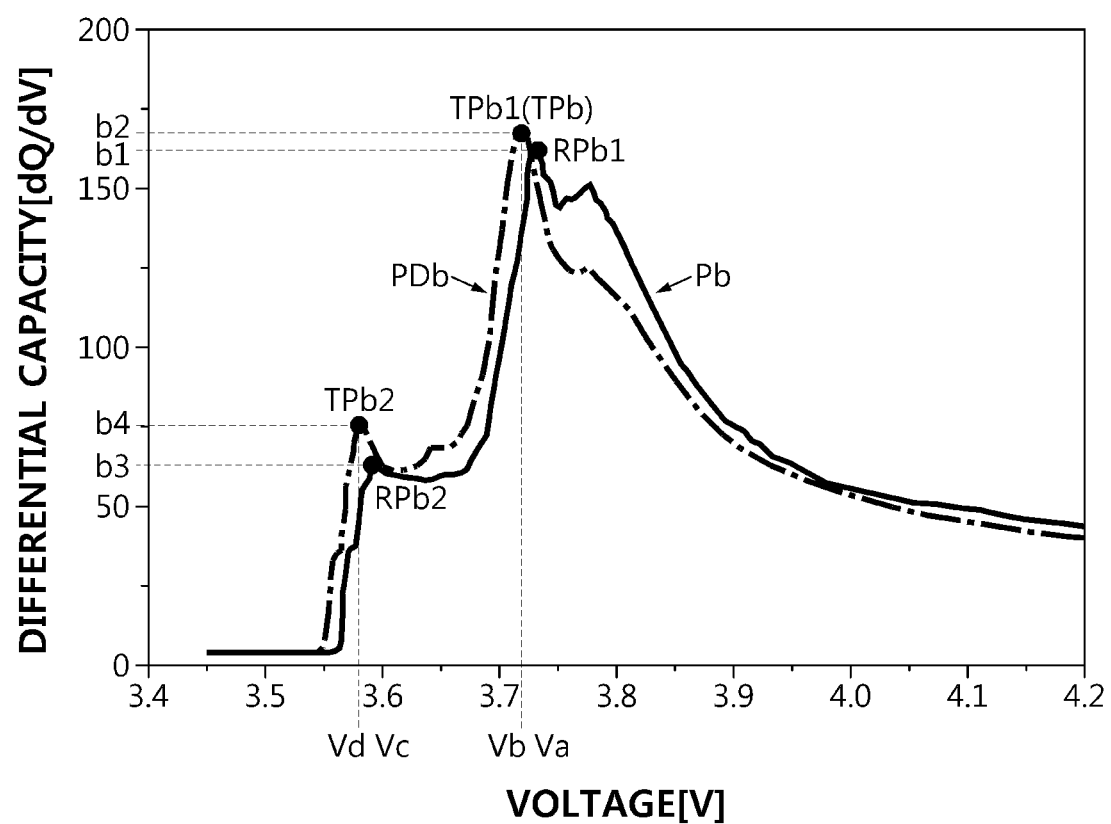
FIG. 5 is a diagram schematically showing still another embodiment for diagnosing a state of the negative electrode of the battery based on the reference profile and the differential profile by the battery diagnosing apparatus according to an embodiment of the present disclosure.

FIG. 5 is a diagram schematically showing still another embodiment for diagnosing a state of the negative electrode of the battery based on the reference profile and the differential profile by the battery diagnosing apparatus 100 according to an embodiment of the present disclosure.

For example, in the embodiment of FIG. 5, the voltage of the first target peak TPb1 may be Vb, and the differential capacity may be b2. The voltage of the second target peak TPb2 may be Vd, and the differential capacity may be b4.

Preferably, the control unit 120 may determine the target peak TPb as the first target peak TPb1. In addition, the control unit 120 may determine a peak having a largest differential capacity as the second target peak TPb2 in a voltage region less than the voltage of the target peak TPb.

The control unit 120 may be configured to determine a first behavior pattern of the first target peak TPb1 for a first reference peak RPb1 included in the reference profile PDb and a second behavior pattern of the second target peak TPb2 for a second reference peak RPb2 included in the reference profile PDb.

For example, in the embodiment of FIG. 5, the voltage of the first target peak TPb1 may be Vb, the voltage of the first reference peak RPb1 may be Va, the voltage of the second target peak TPb2 may be Vd, and the voltage of the second reference peak RPb2 may be Vc. In addition, the differential capacity of the first target peak TPb1 may be b2, the differential capacity of the first reference peak RPb1 may be b1, the differential capacity of the second target peak TPb2 may be b4, and the differential capacity of the second reference peak RPb2 may be b3.

In addition, the voltage of the first target peak TPb1 may be smaller than the voltage of the first reference peak RPb1, and the differential capacity of the first target peak TPb1 may be greater than the differential capacity of the first reference peak RPb1. In addition, the voltage of the second target peak TPb2 may be smaller than the voltage of the second reference peak RPb2, and the differential capacity of the second target peak TPb2 may be greater than the differential capacity of the second reference peak RPb2.

The control unit 120 may be configured to diagnose the state of the negative electrode of the battery as the stabilized state, when both the first behavior pattern and the second behavior pattern correspond to the second behavior type.

For example, in the embodiment of FIG. 5, both the first behavior pattern of the first target peak TPb1 and the second behavior pattern of the second target peak TPb2 may correspond to the second behavior type. Accordingly, the control unit 120 may diagnose the state of the negative electrode of the battery of FIG. 5 as the stabilized state.

The control unit 120 may be configured to determine the first target peak TPb1 and the second target peak TPb2, when the behavior pattern determined for the target peak TPb corresponds to the second behavior type.

For example, referring to FIGS. 3 and 5, the voltage of the target peak TPb may be less than the voltage of the reference peak RPb, and the differential capacity of the target peak TPb may be greater than or equal to the differential capacity of the reference peak RPb. Therefore, the control unit 120 may determine the behavior pattern of the target peak TPb first, and then determine the first target peak TPb1 and the second target peak TPb2 when the behavior pattern determined for the target peak TPb corresponds to the second behavior type.

That is, when the behavior pattern of the target peak TPb corresponds to the second behavior type, the control unit 120 may additionally compare the behavior patterns of the first target peak TPb1 and the second target peak TPb2 with a plurality of behavior types in order to more accurately diagnose the state of the negative electrode of the battery.

Therefore, the control unit 120 may more concretely and accurately diagnose the state of the negative electrode of the battery by judging whether the behavior pattern of the target peak TPb corresponds to the second behavior type and then judging whether the behavior pattern of the second target peak TPb2 corresponds to the second behavior type.

The control unit 120 may be configured to decrease at least one of an available state of charge (SOC) region and a maximum allowable temperature of the battery, when the state of the negative electrode of the battery is diagnosed as the stabilized state.

For example, when the state of the negative electrode of the battery is diagnosed as the stabilized state, the reaction area of the negative electrode may be increased compared to the initial state. Since the stabilized state is a state in which the negative electrode contracts and expands during the initial charging and discharging process, lithium plating in which lithium is precipitated on the negative electrode is less likely to occur. Therefore, in the stabilized state, the charge/discharge C-rate control for reducing the occurrence of lithium plating may not be required.

However, even if the state of the negative electrode is diagnosed as the stabilized state, the positive electrode of the battery may be degraded, and loss of positive electrode capacity may occur due to this degradation of the positive electrode. In order to prevent this positive electrode capacity loss in advance, that is, to slow down the degradation of the positive electrode, the control unit 120 may decrease at least one of the available SOC region and the maximum allowable temperature of the battery when the state of the negative electrode is diagnosed as the stabilized state.

That is, the battery diagnosing apparatus 100 according to an embodiment of the present disclosure may set an optimal usage condition for the battery according to the diagnosed state of the negative electrode. Accordingly, since the battery may be operated according to the usage condition set by the battery diagnosing apparatus 100, the lifespan of the battery may be increased.

For example, the usage condition set by the battery diagnosing apparatus 100 may be stored in a server or in a battery management system (BMS) provided to a battery pack including the corresponding battery. In addition, since the battery is operated according to the set usage condition, the lifespan of the battery may be increased resultantly.

The battery diagnosing apparatus 100 according to the present disclosure may be applied to a BMS (Battery Management System). That is, the BMS according to the present disclosure may include the battery diagnosing apparatus 100 described above. In this configuration, at least some components of the battery diagnosing apparatus 100 may be implemented by supplementing or adding functions of the configuration included in the conventional BMS. For example, the profile generating unit 110, the control unit 120 and the storage unit 130 of the battery diagnosing apparatus 100 may be implemented as components of the BMS.

Figure 6:
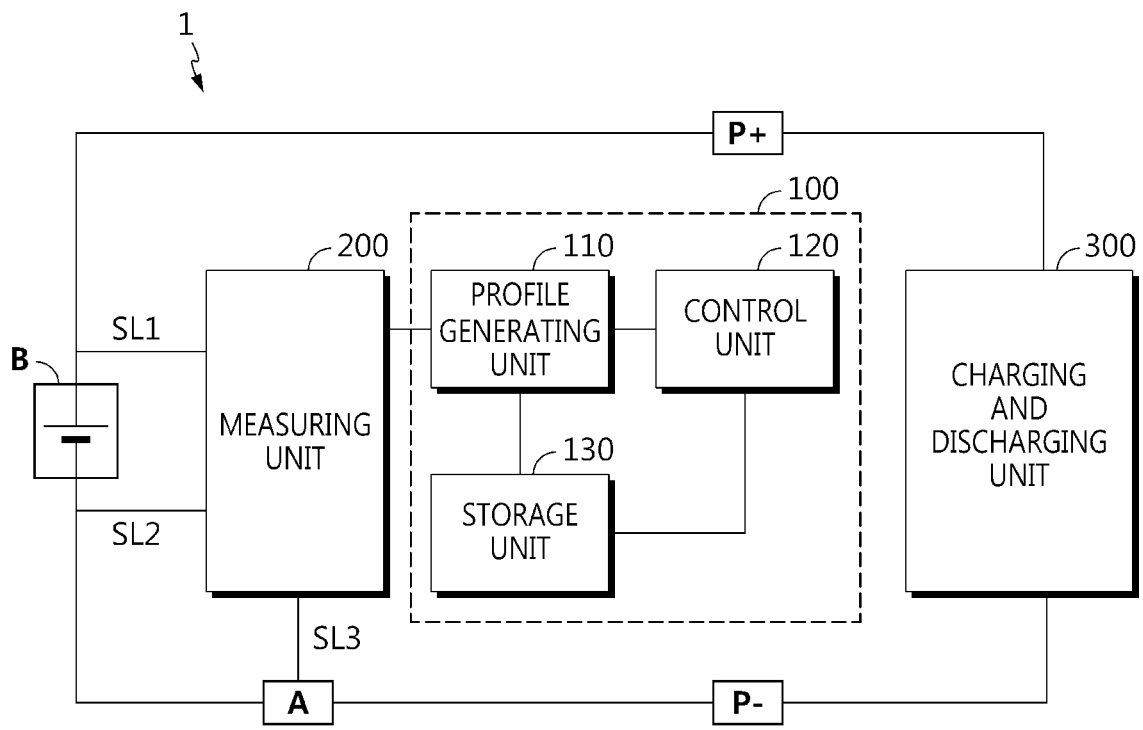
FIG. 6 is a diagram schematically showing an exemplary configuration of a battery pack including the battery diagnosing apparatus according to an embodiment of the present disclosure.

FIG. 6 is a diagram schematically showing an exemplary configuration of a battery pack 1 including the battery diagnosing apparatus 100 according to an embodiment of the present disclosure.

In addition, the battery diagnosing apparatus 100 according to the present disclosure may be provided to a battery pack 1. That is, the battery pack 1 according to the present disclosure may include the above-described battery diagnosing apparatus 100, a measuring unit 200, a charging and discharging unit 300 and at least one battery cell B. In addition, the battery pack may further include electrical equipment (a relay, a fuse, etc.) and a case.

The measuring unit 200 may be connected to a first sensing line SL1, a second sensing line SL2, and a third sensing line SL3.

Specifically, the first sensing line SL1 may be connected to the positive electrode of the battery cell B and the measuring unit 200. Also, the second sensing line SL2 may be connected to the negative electrode of the battery cell B and the measuring unit 200. The measuring unit 200 may measure the voltage of the battery cell B by calculating the difference between the voltage of the positive electrode of the battery cell B measured through the first sensing line SL1 and the voltage of the negative electrode of the battery cell B measured through the second sensing line SL2.

Also, the measuring unit 200 may measure the charging current and/or the discharging current of the battery cell B through a current measuring unit A connected to the third sensing line SL3. For example, the current measuring unit A may be a shunt resistor or an ammeter.

The charging and discharging unit 300 may be configured to charge and/or discharge the battery cell B. In the process of charging and/or discharging the battery cell B by the charging and discharging unit 300, the measuring unit 200 may measure the voltage and current of the battery cell B.

The voltage and current of the battery cell B measured by the measuring unit 200 may be transmitted to the battery diagnosing apparatus 100. Specifically, the profile generating unit may receive the voltage and current of the battery cell B from the measuring unit 200. The profile generating unit may generate a differential profile representing a corresponding relationship between the voltage of the battery cell B and a differential capacity based on the received voltage and current of the battery cell B. Here, it should be noted that the prior art may be applied to a process in which the profile generating unit calculates the capacity and the differential capacity of the battery cell B based on the voltage and current of the battery cell B, and thus a detailed description thereof will be omitted.

Figure 7:
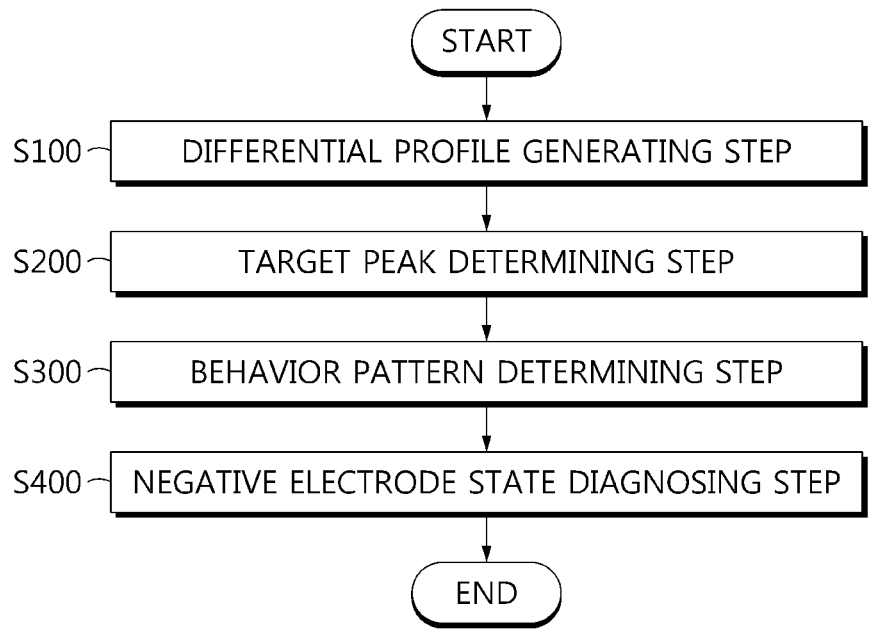
FIG. 7 is a diagram schematically showing a battery diagnosing method according to another embodiment of the present disclosure.

FIG. 7 is a diagram schematically showing a battery diagnosing method according to another embodiment of the present disclosure.

Preferably, each step of the battery diagnosing method according to another embodiment of the present disclosure may be performed by the battery diagnosing apparatus 100 according to an embodiment of the present disclosure. Hereinafter, content overlapping with the previously described content will be omitted or briefly described.

Referring to FIG. 7, the battery diagnosing method may include a differential profile generating step (S100), a target peak determining step (S200), a behavior pattern determining step (S300), and a negative electrode state diagnosing step (S400).

The differential profile generating step (S100) is a step of generating a differential profile representing a corresponding relationship between a voltage of a battery and a differential capacity for the voltage of the battery, and may be performed by the profile generating unit 110.

For example, in the embodiment of FIG. 2, the profile generating unit 110 may generate a differential profile PDa representing a corresponding relationship between the voltage of the battery and the differential capacity.

The target peak determining step (S200) is a step of determining a target peak in the differential profile, and may be performed by the control unit 120.

For example, in the embodiment of FIG. 2, the control unit 120 may determine a peak having a maximum differential capacity in the differential profile PDa as the target peak TPa. A voltage corresponding to the target peak TPa may be V2, and a corresponding differential capacity may be a2.

The behavior pattern determining step (S300) is a step of determining a behavior pattern of the target peak based on a reference peak included in a preset reference profile, and may be performed by the control unit 120.

For example, in the embodiment of FIG. 2, the control unit 120 may determine the behavior pattern of the target peak TPa so that the voltage V2 exceeds the voltage V1 of the reference peak RPa and the differential capacity a2 is less than the differential capacity a1 of the reference peak RPa.

The negative electrode state diagnosing step (S400) is a step of diagnosing a state of a negative electrode of the battery by comparing the behavior pattern determined for the target peak with a plurality of preset behavior types, and may be performed by the control unit 120.

Specifically, the control unit 120 may diagnose the state of the negative electrode of the battery as an overvoltage state or a stabilized state according to a behavior type corresponding to the behavior pattern among the plurality of behavior types.

For example, the plurality of behavior types may include a first behavior type and a second behavior type according to voltages and differential capacities of the target peak and the reference peak. The first behavior type may be a behavior type in which the voltage of the target peak exceeds the voltage of the reference peak and the differential capacity of the target peak is less than the differential capacity of the reference peak. The second behavior type may be a behavior type in which the voltage of the target peak is less than the voltage of the reference peak and the differential capacity of the target peak is equal to or greater than the differential capacity of the reference peak.

In the embodiment of FIG. 2, the control unit 120 may determine that the behavior pattern of the target peak TPa corresponds to the first behavior type. In addition, since the behavior pattern of the target peak TPa corresponds to the first behavior type, the control unit 120 may diagnose the state of the negative electrode of the battery of FIG. 2 as the overvoltage state.

As another example, in the embodiment of FIG. 3, the voltage Vb of the target peak TPb may be less than the voltage Va of the reference peak RPb, and the differential capacity b2 of the target peak TPb may be greater than or equal to the differential capacity b1 of the reference peak RPb. Accordingly, the control unit 120 may determine that the behavior pattern of the target peak TPb corresponds to the second behavior pattern. In addition, the control unit 120 may diagnose the state of the negative electrode of the battery of FIG. 3 as the stabilized state.

The battery diagnosing method has an advantage of diagnosing the state of the negative electrode of the battery to be specifically classified into an overvoltage state or a stabilized state according to the behavior pattern of the target peak.

The embodiments of the present disclosure described above may not be implemented only through an apparatus and a method, but may be implemented through a program that realizes a function corresponding to the configuration of the embodiments of the present disclosure or a recording medium on which the program is recorded. The program or recording medium may be easily implemented by those skilled in the art from the above description of the embodiments.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

REFERENCE SIGNS

1: battery pack
100: battery diagnosing apparatus
110: profile generating unit
120: control unit
130: storage unit
200: measuring unit
300: charging and discharging unit

What is claimed is:

1. A battery diagnosing apparatus, comprising:
a controller; and
memory having programmed thereon instructions that, when executed, are configured to cause the controller to:
   receive a differential profile representing a relationship between a voltage of a battery and a differential capacity of the battery;
   determine a first target peak in the differential profile;
   determine a behavior pattern of the first target peak based on a first reference peak included in a preset reference profile;
   compare the determined behavior pattern with a plurality of preset behavior types; and
   diagnose a state of a negative electrode of the battery based on the comparison,
wherein the controller diagnoses the state of the negative electrode of the battery as either an overvoltage state or a stabilized state based on the determined behavior pattern corresponding to a first behavior type or a second behavior type of the plurality of preset behavior types, and
wherein, in response to the state of the negative electrode of the battery being diagnosed, the controller sets at least one of an available state of charge (SOC) region and a maximum allowable temperature of the battery.

2. The battery diagnosing apparatus according to claim 1, wherein the preset reference profile may be individually set for each battery by reflecting a beginning of life (BOL) state of the battery, and
wherein the state of the negative electrode of the battery diagnosed by the controller may be determined in consideration of the BOL state of the battery for diagnosing the state of the negative electrode.

3. The battery diagnosing apparatus according to claim 1, wherein, in the first behavior type, a voltage of the first target peak exceeds a voltage of the first reference peak and a differential capacity of the first target peak is less than a differential capacity of the first reference peak, and
in the second behavior type, the voltage of the first target peak is less than the voltage of the first reference peak and the differential capacity of the first target peak is equal to or greater than the differential capacity of the first reference peak.

4. The battery diagnosing apparatus according to claim 3, wherein the instructions are configured to cause the controller to:
diagnose the state of the negative electrode of the battery as the overvoltage state, in response to the behavior pattern corresponding to the first behavior type; and
diagnose the state of the negative electrode of the battery as the stabilized state, in response to the behavior pattern corresponding to the second behavior type.

5. The battery diagnosing apparatus according to claim 3, wherein instructions are configured to cause the controller to:
in response to the differential profile including a plurality of peaks within a predetermined voltage region, select the plurality of peaks; and in response to a differential capacity of each of the plurality of selected peaks being less than the differential capacity of the first reference peak and a voltage of each of the plurality of peaks exceeding the voltage of the first reference peak; diagnose the state of the negative electrode of the battery as the overvoltage state.

6. The battery diagnosing apparatus according to claim 5, wherein selection of the plurality of peaks within the predetermined voltage region, is further in response to the behavior pattern corresponding to the first behavior type.

7. The battery diagnosing apparatus according to claim 3, wherein the instructions are configured to cause the controller to:
determine a second target peak in the differential profile, the second target peak having a different voltage from the first target peak;
determine a second behavior pattern of the second target peak for a second reference peak included in the reference profile; and
diagnose the state of the negative electrode of the battery as the stabilized state in response to both the first behavior pattern and the second behavior pattern corresponding to the second behavior type.

8. The battery diagnosing apparatus according to claim 7, wherein determination of the second target peak, is in response to the behavior pattern of the first target peak corresponding to the second behavior type.

9. The battery diagnosing apparatus according to claim 1, wherein the instructions are configured to cause the controller to decrease at least one of an available state of charge (SOC) region and a maximum allowable temperature of the battery, in response to the state of the negative electrode of the battery being diagnosed as the stabilized state.

10. The battery diagnosing apparatus according to claim 1, wherein the first target peak has a maximum differential capacity in the differential profile.

11. A battery pack, comprising the battery diagnosing apparatus according to claim 1.

12. A battery diagnosing method, comprising:
receiving, by a controller, a differential profile representing a relationship between a voltage of a battery and a differential capacity of the battery;
determining, by the controller, a target peak in the differential profile;
determining, by the controller, a behavior pattern of the target peak based on a reference peak included in a preset reference profile;
comparing, by the controller, the determined behavior pattern with a plurality of preset behavior types;
diagnosing, by the controller, a state of a negative electrode of the battery based on the comparison, wherein the controller diagnoses the state of the negative electrode of the battery as either an overvoltage state or a stabilized state based on the determined behavior pattern corresponding to a first behavior type or a second behavior type of the plurality of preset behavior types, and
wherein, in response to the state of the negative electrode of the battery being diagnosed, the controller sets at least one of an available state of charge (SOC) region and a maximum allowable temperature of the battery.

13. The battery diagnosing method according to claim 12, wherein, in the first behavior type, a voltage of the target peak exceeds a voltage of the reference peak and a differential capacity of the target peak is less than a differential capacity of the reference peak, and
in the second behavior type, the voltage of the target peak is less than the voltage of the reference peak and the differential capacity of the target peak is equal to or greater than the differential capacity of the reference peak.

14. The battery diagnosing method according to claim 13, wherein diagnosing comprises:
diagnosing, by the controller, the state of the negative electrode of the battery as the overvoltage state, in response to the behavior pattern corresponding to the first behavior type; and
diagnosing, by the controller, the state of the negative electrode of the battery as the stabilized state, in response to the behavior pattern corresponding to the second behavior type.

15. The battery diagnosing method according to claim 13, further comprising:
in response to the differential profile including a plurality of peaks within a predetermined voltage region, selecting, by the controller, the plurality of peaks; and
in response to a differential capacity of each of the plurality of selected peaks being less than the differential capacity of the reference peak and a voltage of each of the plurality of peaks exceeding the voltage of the reference peak, diagnosing, by the controller, the state of the negative electrode of the battery as the overvoltage state.

16. The battery diagnosing method according to claim 15, wherein selecting of the plurality of peaks within the predetermined voltage region is further in response to the behavior pattern corresponding to the first behavior type.

17. The battery diagnosing method according to claim 13, further comprising:
determining, by the controller, a second target peak in the differential profile, the second target peak having a different voltage from the target peak;
determining, by the controller, a second behavior pattern of the second target peak for a second reference peak included in the preset reference profile; and
diagnosing, by the controller, the state of the negative electrode of the battery as the stabilized state in response to both the behavior pattern and the second behavior pattern corresponding to the second behavior type.

18. The battery diagnosing method according to claim 17, wherein determining of the second target peak is in response to the behavior pattern of the target peak corresponding to the second behavior type.

19. The battery diagnosing method according to claim 12, further comprising:
decreasing, by the controller, at least one of an available state of charge (SOC) region and a maximum allowable temperature of the battery, in response to the state of the negative electrode of the battery being diagnosed as the stabilized state.

20. The battery diagnosing method according to claim 12, wherein the target peak has a maximum differential capacity in the differential profile.

* * * * *